United States Patent
Lee et al.

(10) Patent No.: US 10,602,389 B2
(45) Date of Patent: Mar. 24, 2020

(54) METHOD FOR REPORTING CHANNEL STATE INFORMATION OF TERMINAL IN WIRELESS COMMUNICATION SYSTEM AND DEVICE USING THE METHOD

(71) Applicant: LG ELECTRONICS INC., Seoul (KR)

(72) Inventors: Seungmin Lee, Seoul (KR); Suckchel Yang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,568

(22) PCT Filed: Aug. 16, 2016

(86) PCT No.: PCT/KR2016/008985
§ 371 (c)(1),
(2) Date: Feb. 9, 2018

(87) PCT Pub. No.: WO2017/026873
PCT Pub. Date: Feb. 16, 2017

(65) Prior Publication Data
US 2018/0234870 A1    Aug. 16, 2018

Related U.S. Application Data

(60) Provisional application No. 62/204,952, filed on Aug. 13, 2015.

(51) Int. Cl.
*H04W 72/04* (2009.01)
*H04W 24/10* (2009.01)
(Continued)

(52) U.S. Cl.
CPC .......... *H04W 24/10* (2013.01); *H04B 7/0626* (2013.01); *H04B 17/24* (2015.01);
(Continued)

(58) Field of Classification Search
CPC .............. H04W 24/10; H04W 72/0406; H04L 5/0057; H04L 5/0064; H04L 5/001; H04L 1/0026; H04B 7/0626; H04B 17/24
See application file for complete search history.

(56) References Cited

U.S. PATENT DOCUMENTS 9,838,177 B2 * 12/2017  Sun ....................... H04B 7/0626
2011/0249582 A1 * 10/2011  Choi .................... H04L 5/0091
                                                               370/252
(Continued)

FOREIGN PATENT DOCUMENTS

KR   10-2014-0119055 A    10/2014
WO   WO 2012/093912 A2     7/2012
(Continued)

*Primary Examiner* — Jay P Patel
(74) *Attorney, Agent, or Firm* — Birch, Stewart, Kolasch & Birch, LLP

(57) ABSTRACT

Provided are a method for reporting channel state information of a terminal in a wireless communication system and a device using the method. A terminal receives at least one or more A-CSI request message that triggers aperiodic CSI reports for a plurality of CSI processes of a first cell, and as a response to the at least one or more A-CSI request message, updates at least one of the plurality of CSI processes that were triggered, wherein, if a CSI process capability is defined as the maximum number of CSI processes that the terminal may operate for a specific cell, and if the CSI process capability for the first cell is less than the number of the triggered aperiodic CSI reports, and the CSI process capability for a second cell is more than the number of aperiodic CSI reports triggered for the second cell, the (Continued)

residual CSI process capability for the second cell is used for updating the CSI process for the first cell.

7 Claims, 11 Drawing Sheets

(51) Int. Cl.
    *H04L 5/00*         (2006.01)
    *H04B 17/24*      (2015.01)
    *H04B 7/06*        (2006.01)
    *H04L 1/00*        (2006.01)

(52) U.S. Cl.
    CPC ....... *H04L 5/0057* (2013.01); *H04W 72/0406* (2013.01); *H04L 1/0026* (2013.01); *H04L 5/001* (2013.01); *H04L 5/0064* (2013.01)

(56) References Cited

U.S. PATENT DOCUMENTS

| | | | |
|---|---|---|---|
| 2013/0195045 A1* | 8/2013 | Papasakellariou | H04W 72/042 370/329 |
| 2013/0258965 A1* | 10/2013 | Geirhofer | H04W 72/048 370/329 |
| 2013/0279363 A1 | 10/2013 | Huang et al. | |
| 2014/0086174 A1* | 3/2014 | Nam | H04L 1/0003 370/329 |
| 2014/0269451 A1* | 9/2014 | Papasakellariou | H04B 7/2656 370/280 |
| 2014/0269460 A1* | 9/2014 | Papasakellariou | H04L 5/1469 370/294 |
| 2015/0016291 A1* | 1/2015 | Kim | H04L 1/0026 370/252 |
| 2015/0207604 A1* | 7/2015 | Sun | H04B 7/0626 370/329 |
| 2016/0135143 A1* | 5/2016 | Won | H04W 72/005 370/312 |
| 2016/0142191 A1* | 5/2016 | Davydov | H04L 1/0026 370/329 |
| 2016/0183244 A1* | 6/2016 | Papasakellariou | H04L 5/001 370/329 |
| 2016/0212649 A1* | 7/2016 | Chen | H04W 24/10 |
| 2017/0126299 A1* | 5/2017 | Wei | H04W 24/10 |
| 2017/0244533 A1* | 8/2017 | Onggosanusi | H04B 7/0478 |
| 2017/0273056 A1* | 9/2017 | Papasakellariou | H04W 72/042 |
| 2017/0373792 A1* | 12/2017 | Lunttila | H04L 1/00 |
| 2018/0007681 A1* | 1/2018 | Yang | H04L 1/18 |
| 2018/0083684 A1* | 3/2018 | He | H04B 7/0626 |
| 2018/0331742 A1* | 11/2018 | Yum | H04B 7/04 |

FOREIGN PATENT DOCUMENTS

| | | | | |
|---|---|---|---|---|
| WO | WO 2014/171739 A1 | 10/2014 | | |
| WO | WO 2015/041410 A1 | 3/2015 | | |
| WO | WO2015/165515 A1 * | 11/2015 | ............... | H04L 1/20 |

* cited by examiner

METHOD FOR REPORTING CHANNEL STATE INFORMATION OF TERMINAL IN WIRELESS COMMUNICATION SYSTEM AND DEVICE USING THE METHOD

CROSS REFERENCE TO RELATED APPLICATIONS

This application is the National Phase of PCT International Application No. PCT/KR2016/008985, filed on Aug. 16, 2016, which claims priority under 35 U.S.C. 119(e) to U.S. Provisional Application No. 62/204,952, filed on Aug. 13, 2015, all of which are hereby expressly incorporated by reference into the present application.

BACKGROUND OF THE INVENTION

Field of the Invention

The present invention relates to wireless communication, and more particularly, to a method for reporting channel state information by a user equipment in a wireless communication system and a device for performing such a method.

Related Art

International Telecommunication Union Radio (ITU-R) communication sector is proceeding with standardization of an International mobile telecommunication (IMT)-Advanced, a next-generation mobile communication system following the $3^{rd}$-generation. The IMT-Advanced aims at supporting Internet protocol (IP)-based multimedia services at a data rate of 1 Gbps in a stationary and low-speed movement state and at a data rate of 100 Mbps in a high speed movement state.

$3^{rd}$-generation partnership project (3GPP), a system standard that meets the requirements of the IMT-Advanced, provides long term evolution (LTE)-Advanced by improving the LTE which is based on an orthogonal frequency division multiple access (OFDMA)/single carrier-frequency division multiple access (SC-FDMA) transmission scheme. The LTE-advanced is one of potential candidates for the IMT-Advanced.

In the existing LTE-A, a maximum of five carriers (cells) are aggregated to provide carrier aggregation (CA), but, in a future wireless communication system, enhanced CA (eCA) of aggregating a maximum of 32 carriers (cells) is considered. eCA may be referred to as massive CA.

Meanwhile, the base station may request the user equipment to report channel state information (CSI) on an aperiodic basis. The user equipment, upon receiving the request, may update the CSI process(es) indicated by the request to perform measurement and report the measurement to the base station via the uplink data channel.

However, the number of aperiodic CSI reports that may be transmitted over one uplink data channel may be limited. If the user equipment receives a request of an aperiodic CSI report for more CSI processes than the number of aperiodic CSI reports that can be transmitted on one uplink data channel, it may not be clear how the user equipment will operate in the situation. Specifically, when accumulated aperiodic CSI reports are requested for more CSI processes than the number of CSI processes that a user equipment can process for each cell, it is a problem to select which CSI process to update.

SUMMARY OF THE INVENTION

The present invention provides a method for transmitting a CSI of a user equipment in a wireless communication system and a user equipment for performing the method.

In one aspect, provided is a method for reporting channel state information (CSI) by a user equipment (UE) in a wireless communication system. The method includes receiving at least one A-CSI request message triggering aperiodic CSI reports for a plurality of CSI processes for a first cell and updating at least one of the plurality of CSI processes for the triggered aperiodic CSI reports in response to receipt of the at least one A-CSI request message. A maximum number of CSI processes that the user equipment can process for a corresponding cell is defined as a CSI process capability of the user equipment for the corresponding cell. When a CSI process capability for the first cell is smaller than the number of CSI processes associated with the triggered aperiodic CSI reports for the first cell, and a CSI process capability for a second cell is greater than the number of CSI processes associated with aperiodic CSI reports triggered for the second cell, the user equipment updates the CSI processes for the first cell using a redundant portion of the CSI process capability for the second cell.

The UE may receive a first A-CSI request message requesting aperiodic CSI reports for N (N is a natural number equal to or greater than 1) CSI processes for the first cell and receive a second A-CSI request message requesting aperiodic CSI reports for M (M is a natural number equal to or greater than 1) CSI processes for the first cell.

The UE may update at least one CSI process among the N+M CSI processes in responding to reception of the first A-CSI request message and the second A-CSI request message. When the CSI process capability of the user equipment for the first cell is defined as K1 (K1 is a natural number equal to or greater than 1) and the CSI process capability of the user equipment for the second cell is defined as K2 (K2 is a natural number equal to or greater than 1) and when K1 is less than N+M, and when request of aperiodic CSI reports for a number of CSI processes for the second cell smaller than K2 is received by the user equipment, the user equipment updates a number of CSI processes for the first cell greater than K1 using a redundant portion of the CSI process capability for the second cell.

The N CSI processes may have a higher update priority than the M CSI processes.

The first A-CSI request message may be received before the second A-CSI request message.

The CSI processes for the aperiodic CSI report triggered by the first A-CSI request message may have a higher update priority than the CSI process for the aperiodic CSI report triggered by the second A-CSI request message.

When a cell index value for the first cell is smaller than a cell index value for the second cell, the CSI process for the aperiodic CSI report for the first cell may have a higher update priority than the CSI process for the aperiodic CSI report for the second cell.

Among CSI processes for aperiodic CSI reports for the same cell, a CSI process with a smaller index value may haves a higher update priority than a CSI process with a larger index value.

In another aspect, provided is a user equipment. The user equipment includes an RF unit configured for transmitting and receiving a wireless signal and a processor coupled to the RF unit. The processor is configured for: controlling the RF unit to receive at least one A-CSI request message triggering aperiodic CSI reports for a plurality of CSI processes for a first cell and updating at least one of the plurality of CSI processes for the triggered aperiodic CSI reports in response to receipt of the at least one A-CSI request message. A maximum number of CSI processes that the user equipment can process for a corresponding cell is defined as a CSI process capability of the user equipment for the corresponding cell. When a CSI process capability for the first cell is smaller than the number of CSI processes associated with the triggered aperiodic CSI reports for the first cell, and a CSI process capability for a second cell is greater than the number of CSI processes associated with aperiodic CSI reports triggered for the second cell, the user equipment updates the CSI processes for the first cell using a redundant portion of the CSI process capability for the second cell.

When a user equipment receives an aperiodic CSI report request for multiple cells, it may occur that for the first cell, the user equipment may receive a request of an aperiodic CSI report for the number of CSI processes more than a number corresponding to the capabilities of the user equipment, while for the second cell, the user equipment may receive a request of an aperiodic CSI report for the number of CSI processes less than a number corresponding to the capabilities of the user equipment. In this case, according to the present invention, the user equipment capability for the second cell may be used for the first cell such that the CSI processes for the aperiodic CSI report for the first cell may be updated. Therefore, it is possible to prevent the waste of the user equipment capability and efficiently perform the CSI report.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
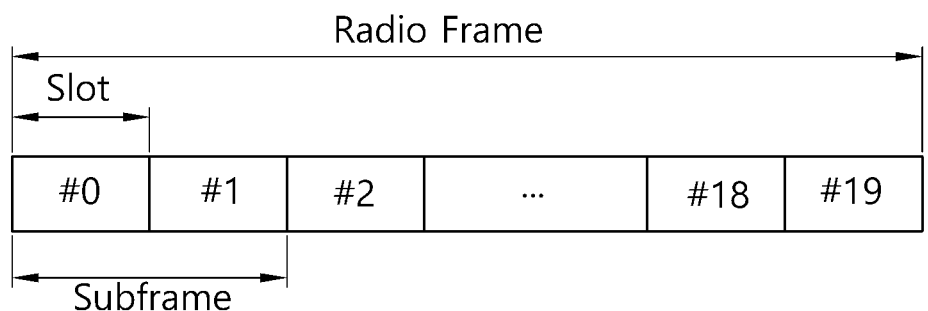
FIG. 1 shows the structure of a radio frame in 3GPP LTE/LTE-A.

FIG. 1 shows the structure of a radio frame in 3GPP LTE/LTE-A.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms. The structure of the radio frame is only an example. Accordingly, the number of subframes included in the radio frame or the number of slots included in the subframe can be changed in various ways.

Figure 2:
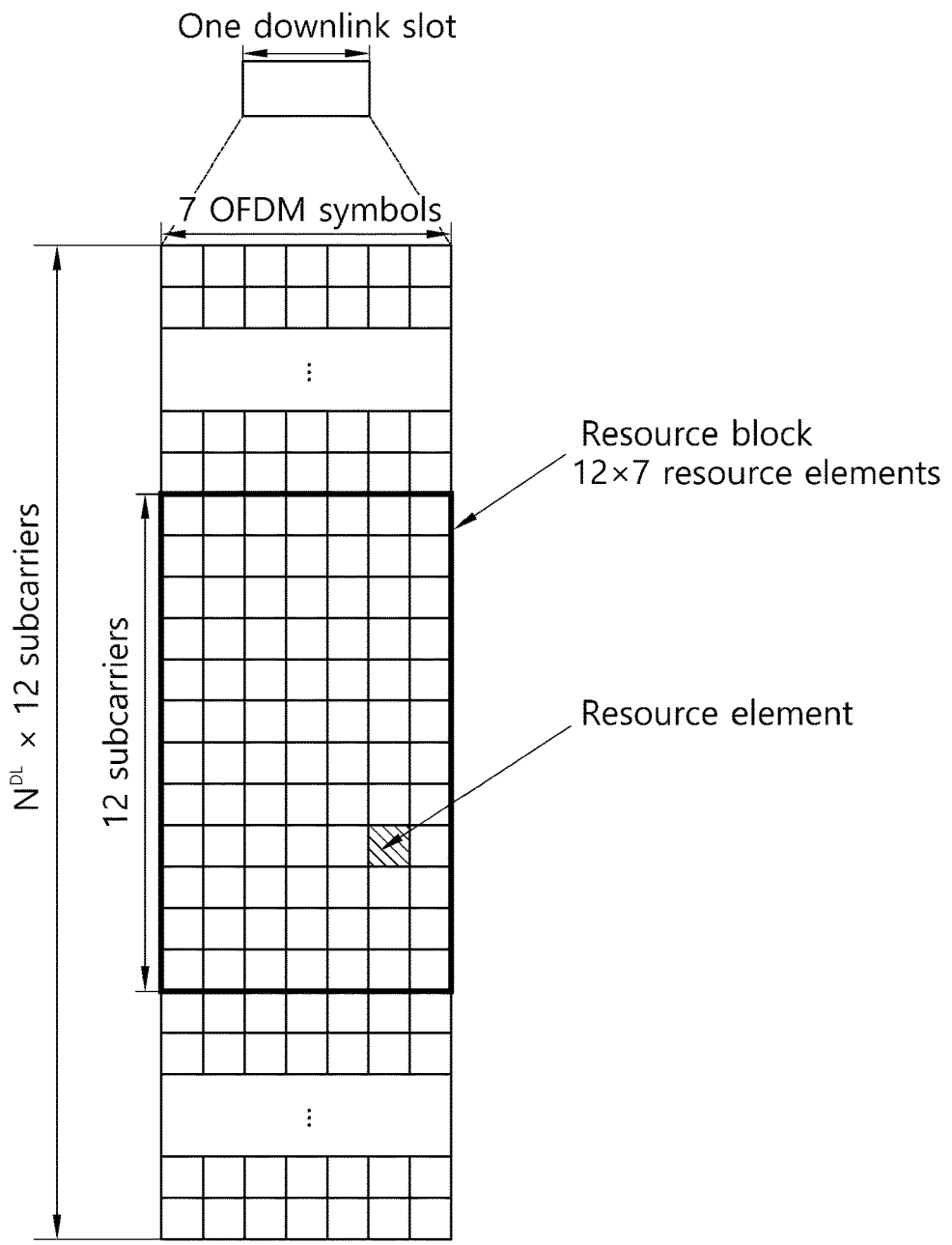
FIG. 2 shows an example of a resource grid for one slot.

FIG. 2 shows an example of a resource grid for one slot. The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k (k=0, $N_{RB} \times 12-1$) is a subcarrier index within the frequency domain, and l (l=0, . . . , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
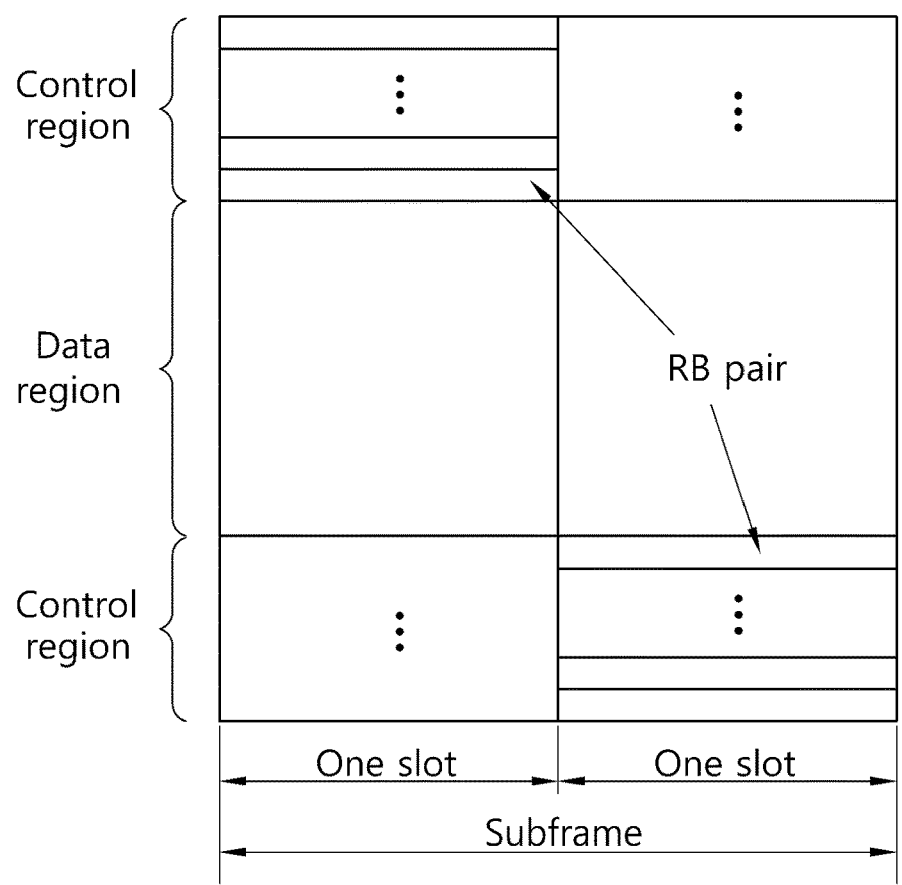
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted are allocated to the control region.

Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 4:
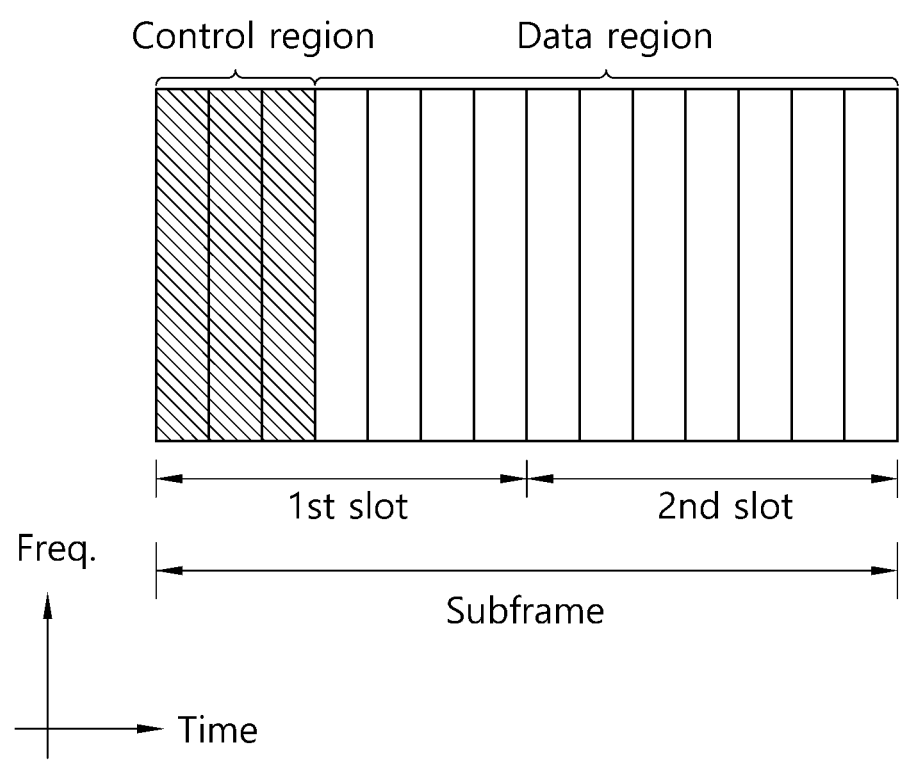
FIG. 4 shows the structure of a downlink subframe.

FIG. 4 illustrates a structure of a downlink (DL) subframe.

A DL subframe includes two slots in a time domain and each slot includes seven OFDM symbols in a normal CP (or six OFDM symbols in an extended CP). A maximum of first three OFDM symbols of a first slot of the subframe (a maximum of 4 OFDM symbols regarding a 1.4 MHz bandwidth) are a control region to which control channels are allocated, and the other OFDM symbols are a data region to which a physical downlink shared channel (PDSCH) is allocated. The PDSCH refers to a change in which a base station (BS) or a node transmits data to a user equipment (UE).

The control channel transmitted in the control region includes a physical control format indicator channel (PCFICH), a physical hybrid-ARQ indicator channel (PHICH), and a physical downlink control channel (PDCCH).

The PCFICH transmitted in the first OFDM symbol of the subframe carries a control format indicator (CFI), information regarding the number of OFDM symbols (i.e., a size of the control region) used for transmission of control channels within the subframe. After the UE first receives a CFI on the PCFICH, the UE monitors a PDCCH. The PCFICH is transmitted through a fixed PCFICH resource of the subframe.

The PHICH carries a ACK (acknowledgement)/NACK (not-acknowledgement) signal for an uplink hybrid automatic repeat request (HARQ). The ACK/NACK signal regarding uplink data transmitted from the UE is transmitted on the PHICH.

The PDCCH is a control channel transmitting downlink control information (DCI). The DCI may include resource allocation of a PDSCH (which may also be referred to as "downlink (DL) grant", resource allocation of a physical uplink shared channel (PUSCH) (which may also be referred to as "uplink (UL) grant"), an aggregation of a transmission power control command regarding individual UEs of a certain UE group and/or activation of a VoIP (Voice over Internet Protocol).

Figure 5:
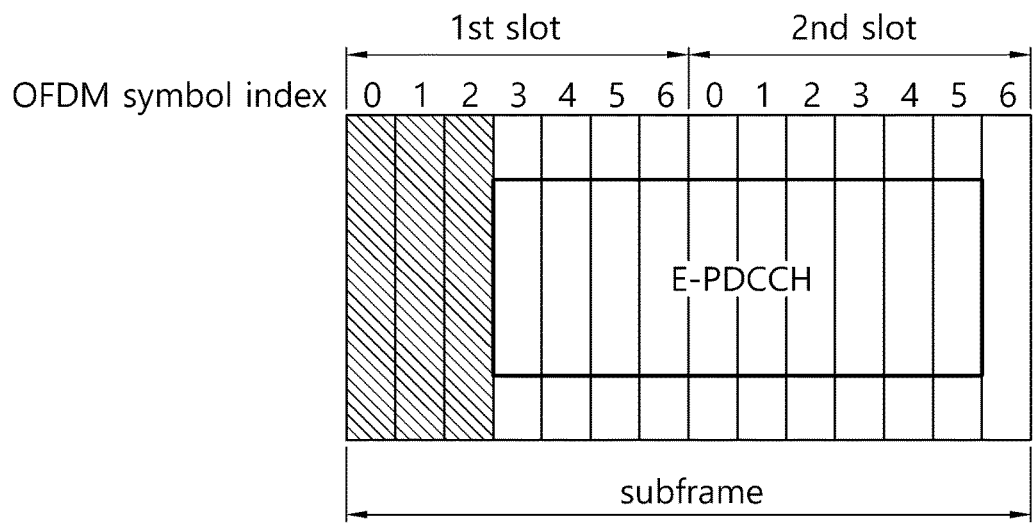
FIG. 5 illustrates an EPDCCH.

FIG. 5 illustrates an EPDCCH.

Referring to FIG. 5, an EPDCCH may be positioned to follow an existing control region in a time domain. For example, when the existing control region is transmitted in first three OFDM symbols of a subframe, the EPDCCH may be positioned in OFDM symbols positioned to follow the three OFDM symbols. In a frequency domain, the existing control region and the PEDCCH may be configured to correspond to each other or to be different. For example, the PDCCH is transmitted in the entire system band, whereas the PEDCCH may be transmitted only in the same frequency band as that of the PDSCH transmitted for a specific UE. In FIG. 5, an example in which the PEDCCH is transmitted only in some frequency band of the existing control region is illustrated. In the EPDCCH, control information for an advanced UE may be transmitted. In the EPDCCH, a reference signal for demodulation of the PDSCH may be transmitted.

<Carrier Aggregation (CA)>

Hereinafter, CA will be described.

Figure 6:
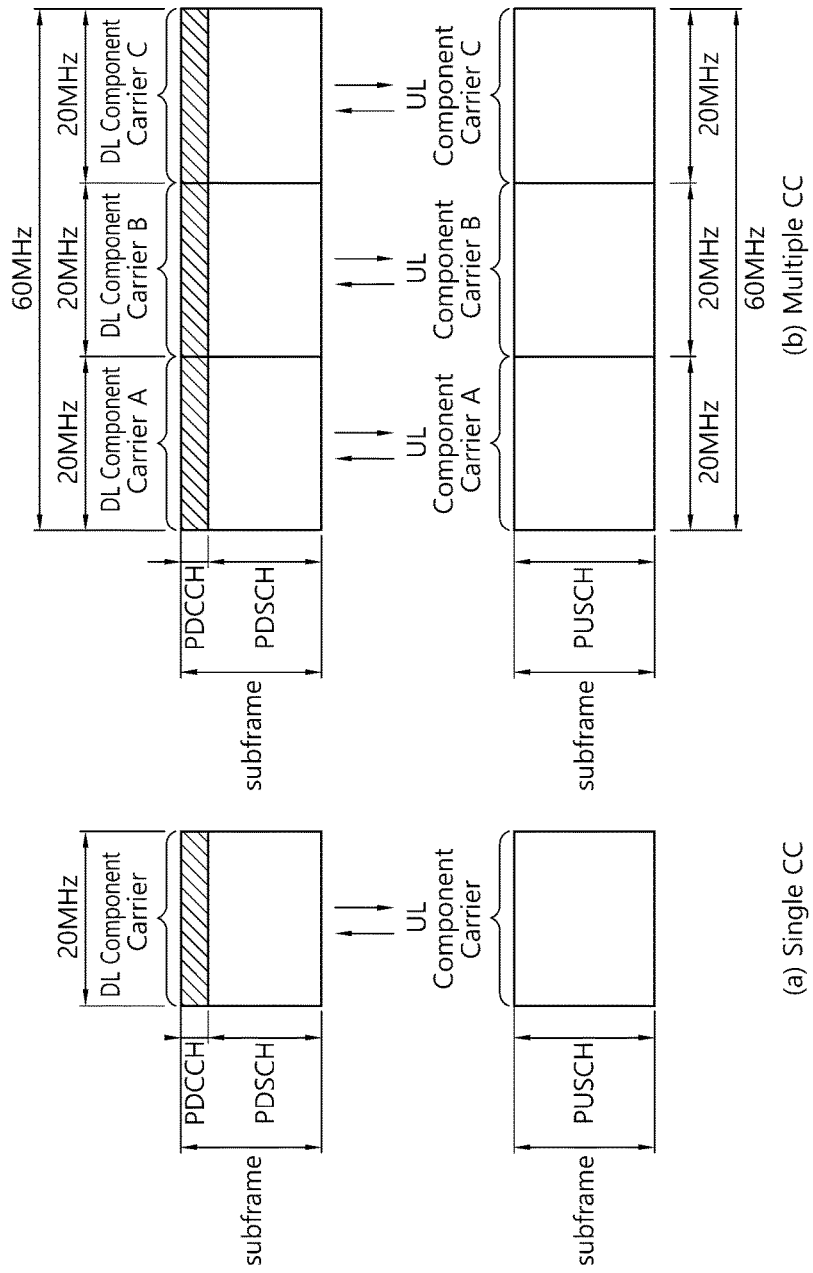
FIG. 6 is a comparison example of an existing single carrier system and a CA system.

FIG. 6 is a comparison example of an existing single carrier system and a CA system.

Referring to FIG. 6, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of CCs, that is, a plurality of serving cells.

Such a CA system can support non-cross-carrier scheduling and cross-carrier scheduling.

Figure 7:
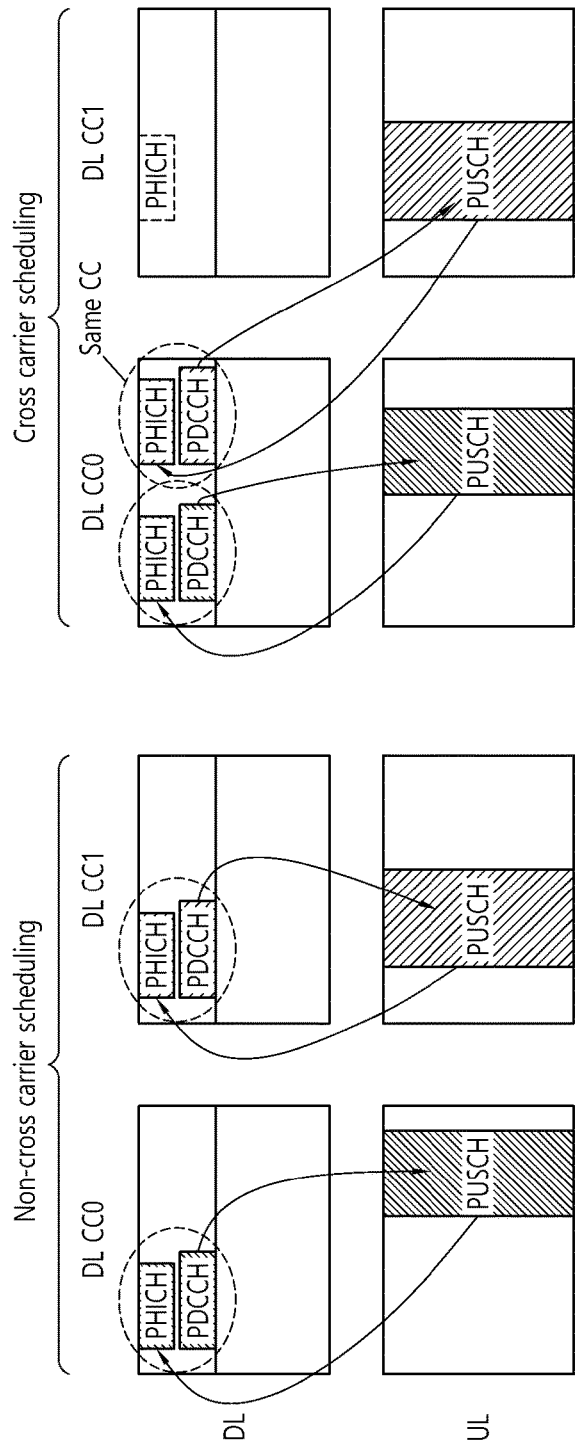
FIG. 7 illustrates non-cross-carrier scheduling and cross-carrier scheduling.

FIG. 7 illustrates non-cross-carrier scheduling and cross-carrier scheduling.

Non-cross-carrier scheduling may be said to be a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC.

Cross-carrier scheduling is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

Now, the present invention will be described.

According to the present invention, when a large number of cells are configured using the carrier aggregation technique (CA), the present disclosure propose a method to efficiently update aperiodic CSI (hereinafter referred to as A-CSI) and transmit the updated CSI.

Hereinafter, for convenience of explanation, a license-based cell is referred to as LCELL, and a cell based on a non-licensed band (LTE-U) may also be referred to as UCELL. Further, the resource period acquired/configured in an aperiodic manner in the corresponding UCELL is designated as a reserved resource period (RRP).

A control information channel associated with the PDSCH transmitted on the downlink subframe of the RRP period, i.e., the subframe designated for the downlink, or a control information channel associated with the PUSCH transmitted on the uplink subframe of the RRP period, i.e., the subframe designated for the uplink may be configured to be transmitted from a predefined LCELL. That is, cross carrier scheduling (CCS) may be used. Alternatively, the control information channels may be transmitted from the same UCELL. That is, self-scheduling (SFS) may be used.

The downlink control information channel associated with PDSCH reception in the RRP period may be configured such that one downlink control information channel schedules one PDSCH received at the same (or specific) time point (subframe). This is called single subframe scheduling (SSFS). Alternatively, the downlink control information channel associated with PDSCH reception in the RRP period may be configured such that one downlink control information channel schedules one PDSCH received at the same (or specific) time point (subframe) and a predefined or signaled number of PDSCHs received at different time points. This is called multi subframe scheduling (MSFS).

The RRP period on the UCELL may be a resource configured in an aperiodic or discrete manner depending on the carrier sensing (CS) results.

As an example, the RRP period on UCELL may be defined by at least one of followings: 1) a period during which a user equipment performs a (time/frequency) synchronization operation on UCELL or during which it may be assumed that a synchronization signal (for example, PSS, SSS) is transmitted from the base station to the user equipment, 2) a period during which the user equipment performs a CSI measurement operation on the UCELL or during which it may be assumed that a reference signal (e.g. CRS, CSI-RS) for this measurement is transmitted from the base station thereto, 3) a period during which the user equipment performs DCI detection operation related to data transmission/reception in the UCELL, 4) a period during which the user equipment performs transitory or temporary buffering operation of the signal received from the UCELL.

Hereinafter, for convenience of explanation, the proposed scheme will be described based on the 3GPP LTE/LTE-A system. However, the scope of the system to which the proposed scheme is applied is not limited to the 3GPP LTE/LTE-A system and may be extended to other systems.

For example, according to the present invention, "(one) CSI process" may be interpreted 1) as a CSI measurement/report operation (process) for a particular cell (for example, transmission mode: TM 1-9), and/or as a CSI measurement/report operation (process) associated with some (or all) of a number of CSI processes pre-configured/signaled for a particular cell (for example, TM10).

The user equipment may receive an aperiodic CSI report request from the base station, perform measurements on the CSI process indicated by the aperiodic CSI report request, and transmit the measurement result to the base station via the PUSCH.

For example, if the user equipment decodes the uplink DCI format or decodes the random access response grant in the subframe n, and when the CSI request field included in the uplink DCI format or random access response grant triggers aperiodic CSI reporting, the user equipment may transmit the aperiodic CSI using the PUSCH in the subframe n+k of the serving cell c.

The CSI request field may be composed of one bit or two bits.

When the CSI request field is composed of 1 bit, the user equipment is configured in one of the transmission modes 1 to 9, and 'csi-SubframePatternConfig' is not configured for the specific serving cell, and if the value of the CSI request field is 1, an aperiodic CSI report for the serving cell is triggered.

Tables 1 to 3 below illustrate the meaning of cases when the CSI request field is composed of two bits.

TABLE 1

| CSI request field value | Descriptions |
| --- | --- |
| 00 | No aperiodic CSI report is triggered |
| 01 | Aperiodic CSI report is triggered for serving cell c |
| 10 | Aperiodic CSI report is triggered for a first set of serving cells configured by high layers |
| 11 | Aperiodic CSI report is triggered for a second set of serving cells configured by high layers |

TABLE 1

| CSI request field value | Descriptions |
| --- | --- |
| 00 | No aperiodic CSI report is triggered |
| 01 | Aperiodic CSI report is triggered for a set of CSI process(s) configured by high layers for serving cells c |
| 10 | Aperiodic CSI report is triggered for a first set of CSI process(s) configured by high layers |
| 11 | Aperiodic CSI report is triggered for a second set of CIS process(s) configured by high layers |

In Table 1, when the value of the CSI request field is '10' or '11', an aperiodic CSI report is triggered for a specific set of serving cells. On the other hand, in Table 2, when the value of the CSI request field is '10' or '11', an aperiodic CSI report is triggered for a specific set of CSI processes. The CSI process is defined as a CSI measurement associated with one non-zero power CSI-RS resource and one CSI-IM (interference measurement) resource.

TABLE 3

| CSI request field value | Descriptions |
|---|---|
| 00 | No aperiodic CSI report is triggered |
| 01 | Aperiodic CSI report is triggered for a set of CSI process(s) and/or {CSI process, CSI subframe set}-pair(s) configured by high layers for serving cells c |
| 10 | Aperiodic CSI report is triggered for a first set of CSI process(s) and/or {CSI process, CSI subframe set}-pair(s) configured by high layers |
| 11 | Aperiodic CSI report is triggered for a second set of CIS process(s) and/or {CSI process, CSI subframe set}-pair(s) configured by high layers |

On the other hand, if the user equipment is configured in transmission modes 1-9 for the serving cell, the CSI process may mean aperiodic CSI configured for the user equipment for the serving cell in Table 2. The user equipment does not expect more than 5 CSI processes to be configured in each of the first CSI process set and the second CSI process set. Further, the user equipment does not expect more than 5 CSI processes and/or {CSI process, CSI subframe set}-pairs to be configured in each of the first CSI process set and the second CSI process set. The user equipment does not expect to receive more than one aperiodic CSI report request in a given subframe.

When more than one CSI process is configured for a serving cell, the user equipment that has received the aperiodic CSI report request (A_CSI_REQ#X) triggering the CSI report according to Table 2 does not expect to perform a CSI update corresponding to the CSI reference resource for CSI processes other than the CSI processes with max (Nx−Nu, 0) CIS processes having the lowest index (associated with the corresponding A_CSI_REQ#X). In this connection, Nu is the number of CSI processes for which the user equipment has not performed a report (associated with another CSI report request (A_CSI_REQ#Y) for the serving cell). In this connection, the CSI process associated with the CSI report request is calculated as a reported CSI process not reported on the previous subframe to the subframe in which the PUSCH of the corresponding CSI (report) is transmitted. $N_{CSI-P}$ is the maximum number of CSI processes supported by the user equipment for the serving cell. $Nx=N_{CSI-P}$ for the FDD serving cell. When four CSI processes are configured for the TDD serving cell, $Nx=N_{CSI-P}$. When two or three CSI processes are configured for a serving cell, Nx=3.

On the other hand, when more than one $N_{CSI-P}$ value is included in UE-EUTRA-Capability, the user equipment assumes an $N_{CSI-P}$ value consistent with its CSI process configuration. When there are two or more $N_{CSI-P}$ values consistent with your CSI process configuration, the user equipment assumes any value from the corresponding values (consistent with its CSI process configuration).

When multiple cell groups are configured for the user equipment, and when the user equipment receives a plurality of aperiodic CSI report requests for triggering two or more CSI reports for different cell groups in one subframe, the user equipment does not receive a request of a CSI update for more than 5 CSI processes.

Figure 8:
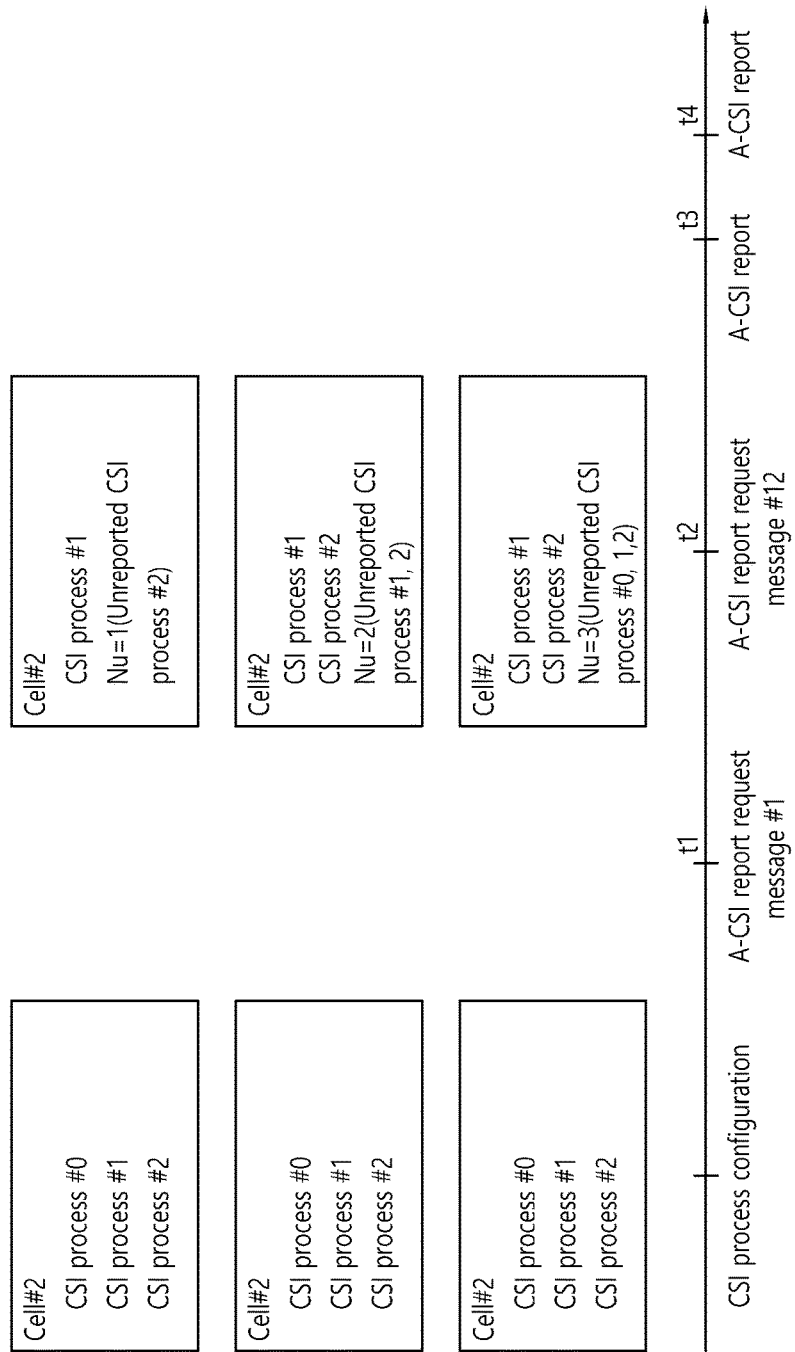
FIG. 8 illustrates scenarios in which the present invention may be applied.

FIG. 8 illustrates scenarios in which the present invention may be applied.

However, FIG. 8 is only an example for convenience of explanation.

Referring to FIG. 8, it is assumed that three FDD cells configured in transmission mode 10 are carrier aggregated for one user equipment UE#K. Transmission mode 10 is a transmission mode that allows transmission of up to 8 layers using antenna ports 7-14, or single antenna port transmission using antenna ports 7, 8, 11 or 13. The three FDD cells are referred to as cell#0, cell#1, and cell#2. The UE#K is assumed to be a user equipment capable of supporting three CSI processes per cell. The (maximum) number of CSI processes that a user equipment can (concurrently) process (for example, measure/calculate/report) for a particular cell is referred to as CSI process capability. The CSI process capability may be determined independently between the cells or may be determined identically between the cells. In this example, it is assumed that the CSI process capability is the same between the cells. It may be assumed that the UE#K has reported its CSI process capability to the base station (via a predefined PER BAND-based (CSI process) capability signaling).

It is assumed that 'three CSI processes', 'three CSI processes', and 'three CSI processes' for cell#0, cell#1, and cell#2 respectively have been configured for the UE#K.

It may be assumed that the UE#K receives an aperiodic CSI report request message (A-CSI REPORT REQUEST MESSAGE)#2 for the three cells at time t2, and the aperiodic CSI report request message#2 has triggered an aperiodic CSI report for 'CSI process#0, CSI process#1 of cell#0', 'CSI process#1, CSI process#2 of cell#1', and 'CSI process#1 of cell#2'. The user equipment may interpret the aperiodic CSI report request message#2 as the most recently received aperiodic CSI report request message.

Further, it is assumed that the UE#K receives an aperiodic CSI report request message#1 for the three cells at time t1 before time t2. For example, it may be assumed that the aperiodic CSI report request message#1 has triggered the aperiodic CSI report for 'CSI process#0, CSI process#1, CSI process#2' of cell#0, 'CSI process#1, CSI process#2 of cell#1', and 'CSI process#2 of cell#2'. In this connection, for example, an aperiodic CSI value (to be measured/calculated) associated with the CSI process#1 of the cell#1 triggered at time t1 and an aperiodic CSI value (to be measured/calculated) associated with the CSI process#1 of the cell#1 triggered at time t2 may be different from each other. That is, this is because that although the logical index values of the CSI processes are equal to 1, the positions of the reference resources for the CSI measurement and/or "interference" and "desired signal" measurements to be used to measure/calculate the aperiodic CSI value may be different therebetween. The aperiodic CSI report request message#1 may be an aperiodic CSI report request message received before the most recently received aperiodic CSI report request message. In this connection, it may be assumed that the aperiodic CSI report triggered by the aperiodic CSI report request message#1 is a 'non-reported aperiodic CSI report' and the corresponding CSI process is a 'unreported CSI process'.

At the t2 time point, for each of the three cells, there may be a number (Nu) of the non-reported CSI processes as follows: that is, for cell#0, there are three non-reported CSI processes (i.e., CSI process#0, CSI process#1, CSI process#2). For cell#1, there are two non-reported CSI processes (i.e. CSI process#1 and CSI process#2). For cell#2, there is one non-reported CSI process (i.e. CSI process#2).

At the subframe of time point t3, the user equipment may send A-CSI reports for A-CSI report request message#1. At a subframe of time point t4, the user equipment may send A-CSI reports for A-CSI report request message#2.

Under this exemplary scenario, the number and configuration of CSI processes (per each cell) that must be updated based on the CSI reference resource (RECENT_CSIREFER) associated with each aperiodic CSI report may be determined by (some or all of) the following proposed rules.

That is, at the time point t2, the maximum number of CSI processes (CSI process capability) that the user equipment can (concurrently) process (for example, perform measurement/calculation/report) for each cell may be 3. In this connection, aperiodic CSI report requests may be accumulated for more than three CSI processes (for a particular cell). For example, for each cell#0, 1, 2, the CSI process capability is 3, and the number of CSI processes for which aperiodic CSI reports are cumulatively requested is 5 for cell#0, 4 for cell#1, and 2 for cell#2. In this case, the present disclosure propose which CSI processes should be updated first. Further, for example, when an aperiodic CSI report is requested (cumulatively) for more or less CSI processes compared to the CSI process capability for each cell, an efficient CSI process update method is also proposed by sharing CSI process capability (between cells). The corresponding rule may be defined such that the 'CSI process capability sharing' operation based on the following proposed method is limitedly applied only to between the LCELL and/or UCELL constituting the same cell group.

According to the present invention, the user equipment may receive a first A-CSI request message requesting an aperiodic CSI report for N (N is a natural number of 1 or more) CSI processes for a first cell at a t1 time point. The user equipment may receive a second A-CSI request message requesting an aperiodic CSI report for M (M is a natural number equal to or greater than 1) CSI processes for the first cell at a time point t2. In this connection, in one example, in terms of the t2 time point, N CSI processes for the first cell for which an aperiodic CSI report is requested at the t1 time point may be assumed to be non-reported CSI processes.

The user equipment responds to the first A-CSI request message and the second A-CSI request message, such that the user equipment performs update (based on the associated CSI reference resource) of at least one of the N+M CSI processes. The user equipment then transmits aperiodic CSI reports for the N+M CSI processes. Referring to FIG. 8, the user equipment may transmit N CSI processes at a time point t3, and may transmit M CSI processes at a time point t4.

In this procedure, due to the limitation of the CSI process capability of the user equipment for each cell, there may be limitations on the update operation related to the aperiodic CSI report.

It may be assumed that the CSI process capability of the user equipment for the first cell is K1 (K1 is a natural number equal to or greater than 1) and that the CSI process capability of the user equipment for the second cell is K2 (K2 is a natural number greater than 1). In this case, when K1 is less than N+M, and the aperiodic CSI report requests for the number of CSI processes less than the number of the CIS process capability for the second cell is received for the second cell by the user equipment, the user equipment switches an redundant CSI process capability for the second cell toward the first cell to update the number of the associated CSI processes (based on the associated CSI reference resource) more than the number K1. Thereafter, the user equipment may transmit the aperiodic CSI reports. That is, by switching the redundant CSI process capability for the second cell toward the first cell, the user equipment may update a larger number of CSI processes than the number corresponding to the CSI process capability for the first cell.

The priority of update may be as follows. The N CSI processes may have a higher priority in terms of the update operation (based on the associated CSI reference resource) than the M CSI processes. That is, the non-reported CSI process has a higher priority in terms of the update operation (based on the associated CSI reference resource) than the CSI process triggered by the most recent aperiodic CSI report request message.

Meanwhile, the aperiodic CSI report may be triggered for a plurality of CSI processes of the second cell, and, the user equipment may update (based on the associated CSI reference resource) of at least one of a plurality of CSI processes for which the aperiodic CSI report is triggered for the first cell and a plurality of CSI processes for which the aperiodic CSI report is triggered for the second cell based on the configured priority.

In this connection, when the cell index value for the first cell is smaller than the cell index value for the second cell, the CSI processes for which the aperiodic CSI report is triggered for the first cell may have a higher priority in terms of the update operation based on the associated CSI reference resource than the CSI processes for which the aperiodic CSI report is triggered for the second cell.

Further, among the CSI processes for which the aperiodic CSI report has been triggered for the same cell, the smaller the index value of the CSI process, the higher the priority in terms of the update operation (based on the associated CSI reference resource).

In the following, more specifically, the present invention will be described.

[Proposed method#1] First, the total number of CSI processes (TOTAL_UPCSINUM) that the user equipment must update based on the corresponding RECENT_CSIREFER for each cell may be calculated by the user equipment.

Under the above exemplary scenario, the total number of CSI processes per cell (TOTAL_UPCSINUM) is 5 for cell#0, 4 for cell#1, and 2 for cell#2.

Then, the user equipment (preferentially) updates the number (Nx) of the CSI processes corresponding to the CSI process capability of the user equipment itself among the total number of CSI processes (TOTAL_UPCSINUM) for each cell (where it may be assumed that the CSI process capability for each cell is 3 in this example). In this connection, a non-reported CSI process and a CSI process with the lowest index may be updated first.

On the other hand, when the total number of CSI processes (TOTAL_UPCSINUM) for a specific cell is less than the number of CSI processes corresponding to the CSI process capability (Nx) (reported by the user equipment), the user equipment may use the redundant CSI process capability for the corresponding specific cell to update the CSI process with a relatively high priority. This may also be applied when the specific cell is deactivated or when the aperiodic CSI report indication (/request) for the specific cell is not made. That is, when the specific cell is deactivated or when the aperiodic CSI report indication (/request) for the specific cell is not made, the user equipment may use the redundant CSI process capability for the corresponding specific cell to update CSI processes having a relatively high priority.

On the other hand, the corresponding priority may be determined by one of the following three methods.

1. OPTION#A. 1) cell group index, 2) aperiodic CSI reporting type, 3) CSI process index(/ID), 4) cell index, 5) CSI subframe set index.

2. OPTION#B. 1) aperiodic CSI reporting type, 2) cell group index, 3) CSI process index(/ID), 4) cell index, 5) CSI subframe set index.

3. OPTION#C. 1) aperiodic CSI reporting type, 2) CSI process index(/ID), 3) cell group index, 4) cell index, 5) CSI subframe set index (or 1) aperiodic CSI reporting type, 2) CSI process index(/ID), 3) cell index, 4) cell group index, 5) CSI subframe set index or 1) aperiodic CSI reporting type, 2) CSI process index(/ID), 3) cell index, 4) CSI subframe set index, 5) cell group index).

In one example, the above [OPTION#A], [OPTION#B], and [OPTION#C] indicate candidate positions where 'cell group index' related parameters may be inserted.

The parameters are consecutively considered and compared (from left to right), so that priorities may be determined. For example, the CSI process associated with a relatively low (or high) cell group index and/or cell index and/or CSI subframe set index and/or CSI process index (/ID) may have a high priority. Alternatively or additionally, the CSI process associated with the LCELL (or UCELL) may have a higher priority than the CSI process associated with the UCELL (or LCELL). Alternatively or additionally, a CSI process associated with a PUCCH transmission cell may have a higher priority than a CSI process associated with a NON-PUCCH transmission cell. Alternatively or additionally, a non-reported CSI process may have a higher priority than a CSI process triggered by the most recent aperiodic CSI report request message.

Under the above exemplary scenario, the priority may be configured as follows: CSI process index (/ ID)→cell index→CSI subframe set index. Further, a non-reported CSI process may have a higher priority than a CSI process triggered by the most recent aperiodic CSI report request message. In this case, the user equipment may use one redundant CSI process update capability for cell#2 to update the CSI process#1 for cell#0.

Therefore, when the above [proposed method#1] is applied, the (final) number and configuration of the CSI processes for each cell actually as updated based on the corresponding RECENT_CSIREFER are as follows: 4 for cell#0 (that is, (non-reported) CSI process#0, (non-reported) CSI process#1, (non-reported) CSI process #2, and the CSI process#1); 3 for cell#1 (that is, (non-reported) CSI process#1, (non-reported) CSI process#2, and the CSI process#1); and 2 for cell#2 (that is, the CSI process#1, (non-reported) CSI process#2).

[Proposed method#2] First, the total number of CSI processes (TOTAL_UPCSINUM) that the user equipment must update based on the corresponding RECENT_CSIREFER for each cell may be calculated by the user equipment. Under the above exemplary scenario, the total number of CSI processes per cell (TOTAL_UPCSINUM) is 5 for cell#0, 4 for cell#1, and 2 for cell#2.

The user equipment determines, among CSI processes of a sum of the total numbers of CSI processes per cell that need to be updated (that is, 5+4+2=11 CSI processes), relatively high priority CSI process for which that the user equipment intends to (or can) actually perform the update using the user equipment' total CSI process capability ('3+3+3=9').

In this connection, when, under the above exemplary scenario, as in the above [proposed method#1], the priority is configured as follows: CSI process index (/ ID)→cell index→CSI subframe set index, and further, a non-reported CSI process has a higher priority than a CSI process triggered by the most recent aperiodic CSI report request message, the number and configuration of the CSI processes for each cell actually as updated based on the corresponding RECENT_CSIREFER are as follows: 5 for cell#0 (that is, (non-reported) CSI process#0, (non-reported) CSI process#1, (non-reported) CSI process #2, and the CSI process#0 and the CSI process#1); 3 for cell#1 (that is, (non-reported) CSI process#1, (non-reported) CSI process#2, and the CSI process#1); and 1 for cell#2 (that is, (non-reported) CSI process#2).

Figure 9:
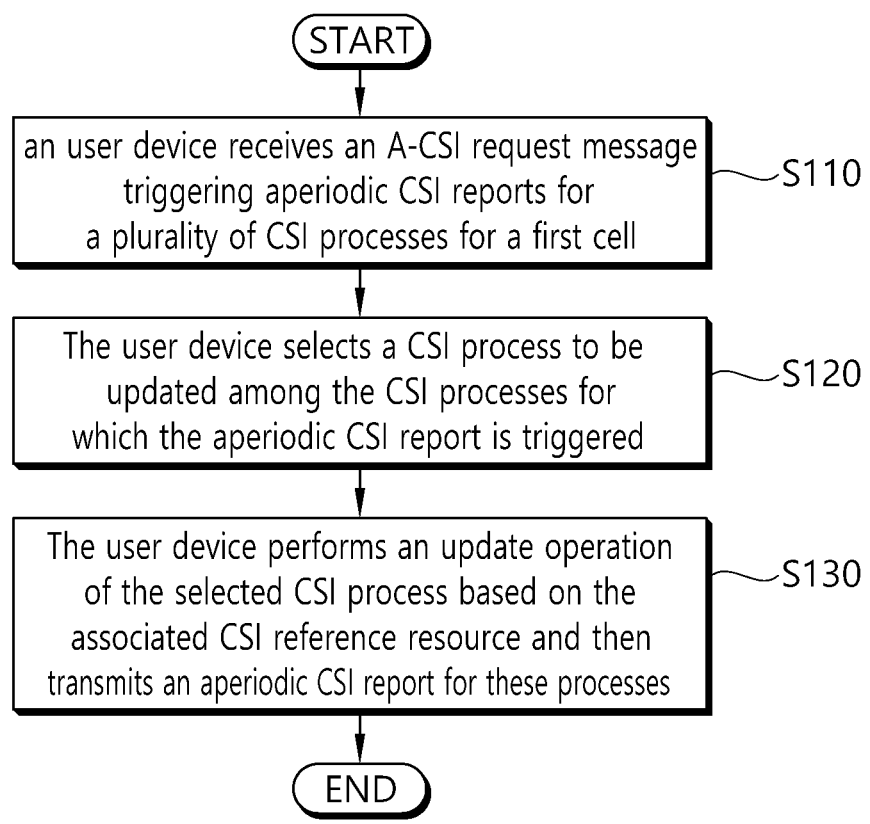
FIG. 9 illustrates a method of reporting channel state information by a user equipment.

FIG. 9 illustrates a method of reporting channel state information by a user equipment.

Referring to FIG. 9, the user equipment receives an A-CSI request message triggering aperiodic CSI reports for a plurality of CSI processes for a first cell (S110).

The user equipment selects a CSI process to be updated among the CSI processes for which the aperiodic CSI report is triggered (S120). The selection of which CSI process to be updated is as described in the proposed method #1 or #2 above.

The user equipment performs an update operation of the selected CSI process (based on the associated CSI reference resource) and then transmits an aperiodic CSI report for these processes (S130).

Figure 10:
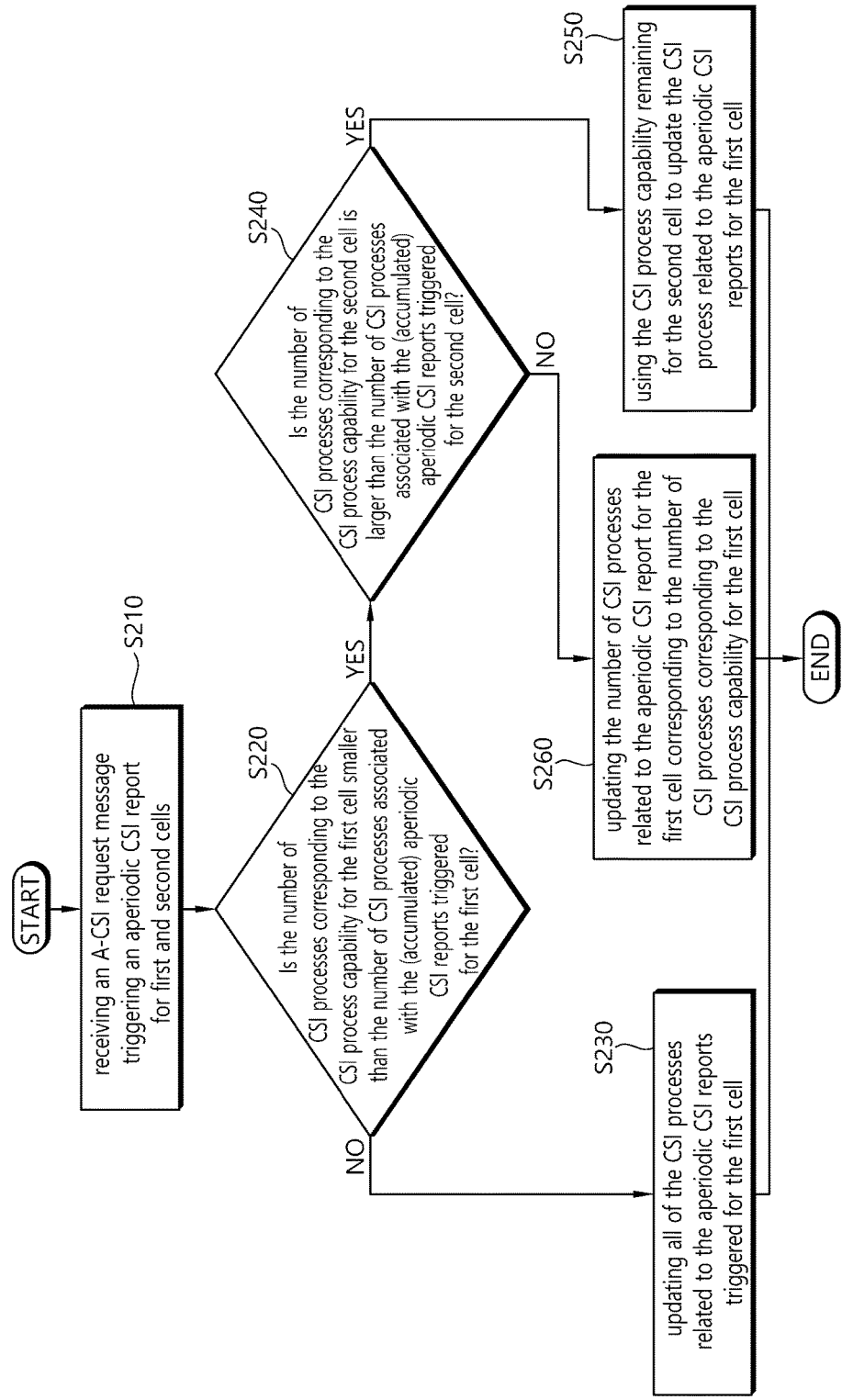
FIG. 10 shows a user equipment operation based on the CSI process capability and the number of triggered aperiodic CSI reports.

FIG. 10 shows a user equipment operation based on the CSI process capability and the number of triggered aperiodic CSI reports.

Referring to FIG. 10, a user equipment receives an A-CSI request message triggering an aperiodic CSI report for first and second cells (S210).

The user equipment determines whether the number of CSI processes corresponding to the CSI process capability for the first cell is smaller than the number of CSI processes associated with the (accumulated) aperiodic CSI reports triggered for the first cell (S220). When the user equipment determines that the number of CSI processes corresponding to the CSI process capability for the first cell is larger than the number of CSI processes associated with the (accumulated) aperiodic CSI reports triggered for the first cell, the user equipment updates all of the CSI processes related to the (accumulated) aperiodic CSI reports triggered for the first cell (based on the associated CSI reference resource) (S230). Thereafter, the user equipment may transmit the updated result as an aperiodic CSI report.

To the contrary, when the user equipment determines that the number of CSI processes corresponding to the CSI process capability for the first cell is smaller than the number of CSI processes associated with the (accumulated) aperiodic CSI reports triggered for the first cell, the user equipment determines whether the number of CSI processes corresponding to the CSI process capability for the second cell is larger than the number of CSI processes associated with the (accumulated) aperiodic CSI reports triggered for the second cell (S240).

When the user equipment determines whether the number of CSI processes corresponding to the CSI process capability for the second cell is larger than the number of CSI processes associated with the (accumulated) aperiodic CSI reports triggered for the second cell, the user equipment updates the CSI processes related to the (accumulated) aperiodic CSI report for the first cell based on the associated CSI reference resource using the redundant CSI process capability for the second cell in S250. To the contrary, when the user equipment determines whether the number of CSI processes corresponding to the CSI process capability for the second cell is smaller than the number of CSI processes associated with the (accumulated) aperiodic CSI reports triggered for the second cell, the user equipment updates the number of CSI processes related to the aperiodic CSI report accumulated for the first cell and corresponding to the number of CSI processes corresponding to the CSI process capability for the first cell, based on the associated CSI reference resource (S260).

It is apparent that the examples of the proposed scheme described above may be included as one of the implementation methods of the present invention, and thus may be regarded as a kind of proposed schemes. Further, the proposed schemes described above may be implemented independently or in combination (or merging) of some proposed schemes.

Figure 11:
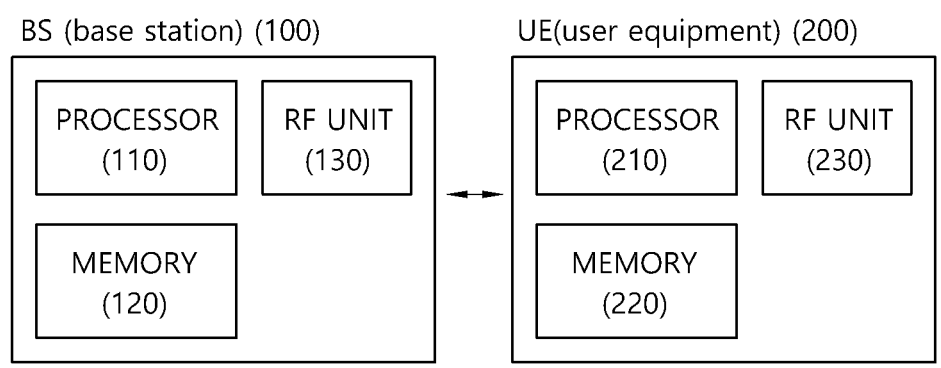
FIG. 11 is a block diagram illustrating a base station and a user equipment.

FIG. 11 is a block diagram illustrating a base station and a user equipment.

The base station 100 includes a processor 110, a memory 120, and an RF unit (radio frequency unit) 130. Processor 110 implements the proposed functionality, process and/or method. The memory 120 is connected to the processor 110 and stores various information for driving the processor 110. The RF unit 130 is connected to the processor 110 to transmit and/or receive a wireless signal.

The user equipment 200 includes a processor 210, a memory 220, and an RF unit (radio frequency unit) 230. Processor 210 implements the proposed functionality, process and/or method. The memory 220 is connected to the processor 210 and stores various information for driving the processor 210. The RF unit 230 is connected to the processor 210 to transmit and/or receive a wireless signal.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for reporting handling channel state information (CSI) by a user equipment (UE) in a wireless communication system, the method comprising:
receiving a first aperiodic CSI (A-CSI) request message requesting aperiodic CSI reports for N CSI processes for a first cell; and
receiving a second A-CSI request message requesting aperiodic CSI reports for M CSI processes for the first cell,
wherein a maximum number of CSI processes that the UE can process for a corresponding cell is defined as a CSI process capability of the UE for the corresponding cell,
wherein when a CSI process capability for the first cell is smaller than the number of CSI processes associated with the aperiodic CSI reports for the first cell, and a CSI process capability for a second cell is greater than the number of CSI processes associated with aperiodic CSI reports triggered for the second cell, the UE updates the CSI processes for the first cell using a redundant portion of the CSI process capability for the second cell,
wherein the first A-CSI request message is received before the second A-CSI request message, and
wherein each of N and M is a natural number equal to or greater than 1.

2. The method of claim 1, further comprising updating at least one CSI process among the N+M CSI processes in response to the received first A-CSI request message and the received second A-CSI request message,
wherein the CSI process capability of the UE for the first cell is defined as K1 and the CSI process capability of the UE for the second cell is defined as K2, wherein each of K1 and K2 is a natural number equal to or greater than 1,
wherein when K1 is less than N+M, and request of aperiodic CSI reports for a number of CSI processes for the second cell smaller than K2 is received by the UE, the UE updates a number of CSI processes for the first cell greater than K1 using a redundant portion of the CSI process capability for the second cell.

3. The method of claim 1, wherein the N CSI processes have a higher update priority than the M CSI processes.

4. The method of claim 1, wherein the CSI processes for the aperiodic CSI report triggered by the first A-CSI request message have a higher update priority than the CSI process for the aperiodic CSI report triggered by the second A-CSI request message.

5. The method of claim 4, wherein when a cell index value for the first cell is smaller than a cell index value for the second cell, the CSI process for the aperiodic CSI report for the first cell has a higher update priority than the CSI process for the aperiodic CSI report for the second cell.

6. The method of claim 1, wherein, among CSI processes for aperiodic CSI reports for the same cell, a CSI process with a smaller index value has a higher update priority than a CSI process with a larger index value.

7. A user equipment (UE) comprising:
a transceiver configured to transmit and receive a radio signal; and
a processor coupled to the transceiver, and configured to control the transceiver to:
receive a first aperiodic channel state information (A-CSI) request message requesting aperiodic CSI reports for N CSI processes for a first cell; and
receive a second A-CSI request message requesting aperiodic CSI reports for M CSI processes for the first cell,
wherein a maximum number of CSI processes that the UE can process for a corresponding cell is defined as a CSI process capability of the UE for the corresponding cell,
wherein when a CSI process capability for the first cell is smaller than the number of CSI processes associated with the triggered aperiodic CSI reports for the first cell, and a CSI process capability for a second cell is greater than the number of CSI processes associated with aperiodic CSI reports triggered for the second cell, the processor is configured to update the CSI processes for the first cell using a redundant portion of the CSI process capability for the second cell,
wherein the first A-CSI request message is received before the second A-CSI request message, and
wherein each of N and M is a natural number equal to or greater than 1.

* * * * *